US012505820B2

(12) United States Patent
Li et al.

(10) Patent No.: US 12,505,820 B2
(45) Date of Patent: Dec. 23, 2025

(54) APPROACH TO AUTOMATIC MUSIC REMIX BASED ON STYLE TEMPLATES

(71) Applicant: Lemon Inc., Grand Cayman (KY)

(72) Inventors: Bochen Li, Los Angeles, CA (US); Vibert Thio, Los Angeles, CA (US); Haonan Chen, Culver City, CA (US); Xuefan Hu, Los Angeles, CA (US); Jitong Chen, Los Angeles, CA (US)

(73) Assignee: LEMON, INC., Grand Cayman (KY)

( * ) Notice: Subject to any disclaimer, the term of this patent is extended or adjusted under 35 U.S.C. 154(b) by 875 days.

(21) Appl. No.: 17/737,282

(22) Filed: May 5, 2022

(65) Prior Publication Data

US 2023/0360619 A1 Nov. 9, 2023

(51) Int. Cl.
*G10H 1/00* (2006.01)

(52) U.S. Cl.
CPC ......... *G10H 1/0008* (2013.01); *G10H 1/0066* (2013.01); *G10H 2210/131* (2013.01); *G10H 2240/075* (2013.01); *G10H 2240/131* (2013.01)

(58) Field of Classification Search
CPC ............... G10H 1/0008; G10H 1/0066; G10H 2210/131; G10H 2240/075; G10H 2240/131
USPC ............................................................ 84/609
See application file for complete search history.

(56) References Cited

U.S. PATENT DOCUMENTS

| | | | | |
|---|---|---|---|---|
| 11,735,199 B2 * | 8/2023 | Duong | G10L 21/013 704/268 |
| 2007/0083762 A1 * | 4/2007 | Martinez | G06Q 30/00 713/176 |
| 2008/0190268 A1 * | 8/2008 | McNally | G11B 27/031 84/645 |
| 2012/0014673 A1 * | 1/2012 | O'Dwyer | G10H 1/0025 386/E5.028 |
| 2012/0059492 A1 * | 3/2012 | Radford | G06F 3/165 700/94 |
| 2014/0000440 A1 * | 1/2014 | Georges | G10H 7/00 84/609 |
| 2021/0110801 A1 * | 4/2021 | Estes | G10H 7/008 |
| 2023/0075884 A1 * | 3/2023 | Jakobsson | H04L 9/50 |

(Continued)

FOREIGN PATENT DOCUMENTS

| | | | | |
|---|---|---|---|---|
| CA | 2929213 C * | 7/2019 | G10H 1/42 |
| EP | 2793222 B1 * | 6/2018 | G10H 1/383 |

(Continued)

*Primary Examiner* — Christina M Schreiber
(74) *Attorney, Agent, or Firm* — Faegre Drinker Biddle & Reath LLP

(57) ABSTRACT

In examples, a method for generating a remixed audio sample is provided. The method may include receiving an audio portion, obtaining metadata from the received audio portion, and analyzing the metadata and generating a symbolic music representation based on the analyzed metadata. In some examples, a selection of a style asset is received and applied to the symbolic music representation. Accordingly, a remixed audio portion may be rendered based on the stylized symbolic representation. That is, metadata associated with a song or song portion may be analyzed to identify a tempo, key, structure, chord, and/or progressions, etc., such that a remixed version of the song can be provided with customized instrumental arrangements and styles.

20 Claims, 9 Drawing Sheets

(56) References Cited

U.S. PATENT DOCUMENTS

| | | | | |
|---|---|---|---|---|
| 2023/0259327 | A1* | 8/2023 | Balassanian | G06N 3/045 700/94 |
| 2023/0343315 | A1* | 10/2023 | Packouz | G10H 1/348 |
| 2023/0360619 | A1* | 11/2023 | Li | G10H 1/0066 |

FOREIGN PATENT DOCUMENTS

| | | | | | |
|---|---|---|---|---|---|
| GB | 2538994 | A | * | 12/2016 | G10H 7/00 |
| GB | 2581319 | A | * | 8/2020 | G11B 27/031 |

* cited by examiner

APPROACH TO AUTOMATIC MUSIC REMIX BASED ON STYLE TEMPLATES

BACKGROUND

Music remixing is at the core of content creation. That is, music remixing especially favors the design dimensions of content diversity, creation barrier, and sociality. Music remixing can be addressed in various ways such as augmenting music beats by utilizing customized sound effects, substituting an instrument backing track with transferred tones or styles, or connecting song excerpts with optimal transitions. Related techniques, such as analyses of beats, harmony, and music structures, have been well reviewed in the research community. However, the extent to which interaction design can utilized in a music remixing system remains a topic of study. Existing remixing systems/methods in the market include DJ mixer where two pre-selected audio files are mixed directly based on tempo synchronization; utilizing an accompaniment generator device, such as a music keyboard that takes an input of user defined chords and generates multi-instrument accompaniments; and accompaniment generation software that takes the input of chord symbols an generates multi-instrument accompaniments. However, there remains a need to enhance the audio mixing process such that additional styles of audio mixing may be obtained in an automated and manner.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for generating a remixed audio sample.

In one aspect, a method for generating a remixed audio sample is provided. An audio portion is received. Metadata from the received audio portion is obtained. The metadata is analyzed and a symbolic music representation based on the analyzed metadata is generated. A selection of a style asset is received and the style asset is applied to the symbolic music representation. A remixed audio portion is rendered based on the stylized symbolic representation.

In another aspect, a system for generating a remixed audio sample is provided. The system comprises at least one processor; and memory storing instructions that, when executed by the at least one processor, causes the system to perform a set of operations, the set of operations including: receiving an audio portion; obtaining metadata from the received audio portion; analyzing the metadata and generating a symbolic music representation based on the analyzed metadata; receiving a selection of a style asset; applying the style asset to the symbolic music representation; and rendering a remixed audio portion based on the stylized symbolic representation.

In yet another aspect, a computer-readable medium is provided. The computer-readable medium including processor executable instructions, which when executed by a processor, cause the processor to: receive an audio portion; obtain metadata from the received audio portion; analyze the metadata and generating a symbolic music representation based on the analyzed metadata; receive a selection of a style asset; apply the style asset to the symbolic music representation; and render a remixed audio portion based on the stylized symbolic representation.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
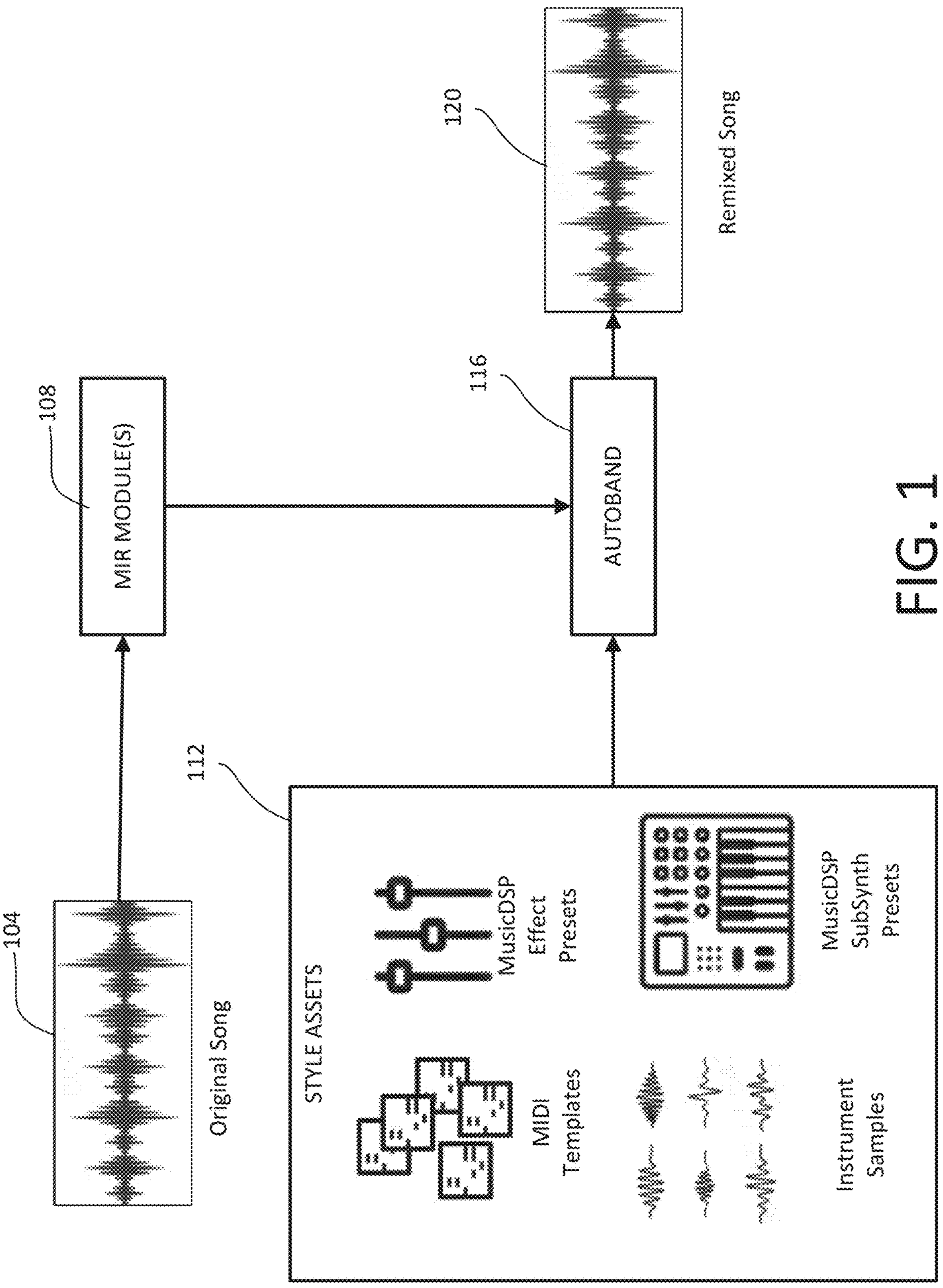
FIG. 1 illustrates an overview of an example system for generating a remixed audio sample in accordance with examples of the present disclosure.

In accordance with examples of the present disclosure, a music mixing system may be utilized that receives an input including a song provided by a user. Details of a template-based music remix system, which takes an input of any commercial song, analyzes attributes and/or metadata of the song to identify a tempo, key, structure, chord, progressions, etc., and automatically returns a remixed version of the song with customized instrumental arrangements and styles is described in accordance with examples of the present disclosure. As depicted in FIG. 1, an input may be received, where the input may comprise an original song 104. In accordance with examples of the present disclosure, the original song 104 may include an entire song, for example, from start to finish, or may, include a portion of a song, such as an audio clip or audio portion. The original song 104 may be provided to one or more music information retrieval modules 108. The music information retrieval modules 108 may analyze metadata associated with the original song 104. As an example, the metadata may be obtained or otherwise extracted from the original song 104. Alternatively, or in addition, the metadata may be generated based on one or more characteristics or attributes of the original song 104. For example, one or more music information retrieval algorithms may be utilized to identify, generate, or otherwise obtain a tempo, chord, and/or key structures, etc., based on the original song 104.

The one or more music information retrieval modules 108 may separate the original song 104, or a derivation of the original song 104, into different instrumental tracks, such as a vocals track, a drum track, a base track, etc. In accordance with examples of present disclosure, one or more style assets 112 may be obtained where such style assets may refer to one or more user provided styles, templates, and/or effects. For example, such style assets 112 may be combined with the metadata obtained from the original song 104 via the music information retrieval module 108 utilizing an autoband module 116, The autoband module 116, for example, may generate multi-instrument arrangements for different styles, such as mixing styles, based on user preference information and/or user selected styling assets. That is, given the input of any song, a multi-instrument arrangement may be automatically generated or selected, to obtain one or more mixing effects.

Figure 2:
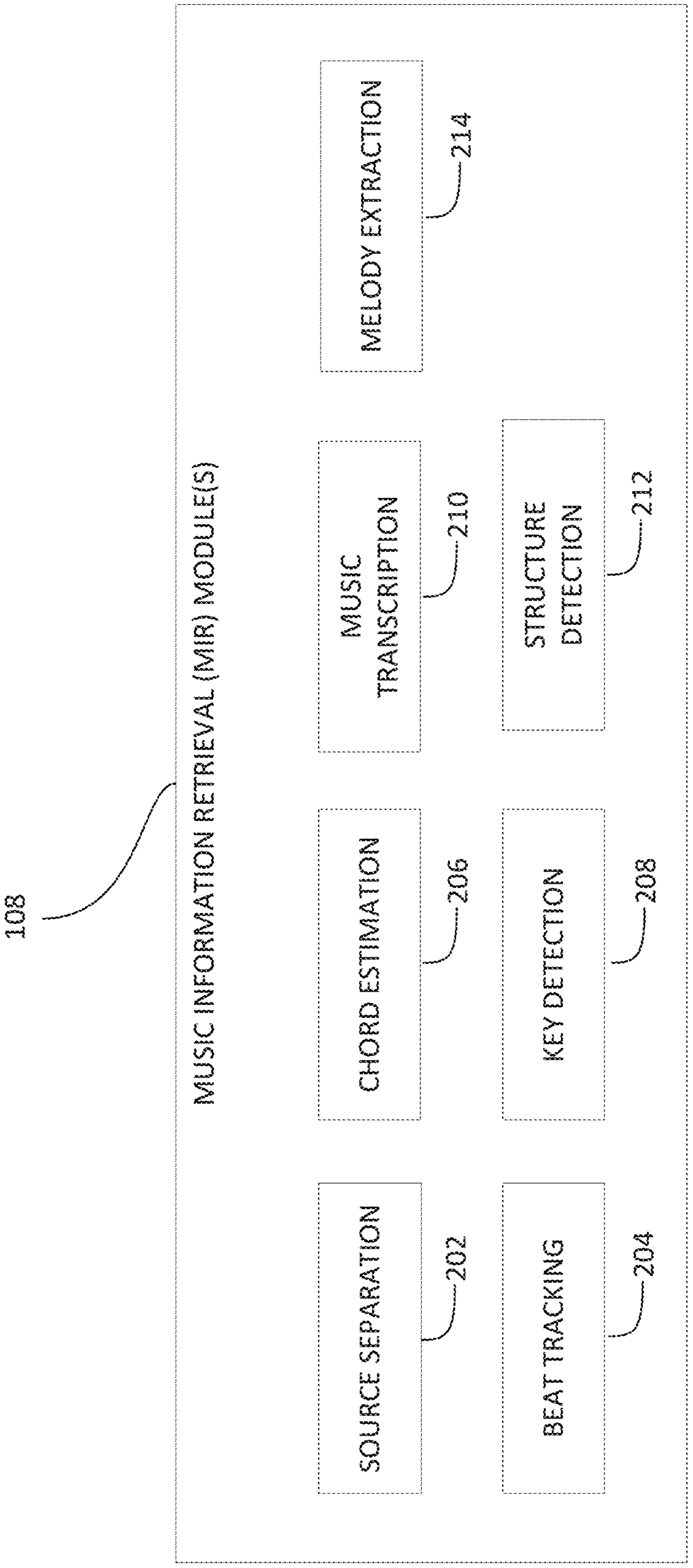
FIG. 2 illustrates additional details of an example system for generating a remixed audio sample in accordance with examples of the present disclosure.

FIG. 2 depicts additional details directed to the music information retrieval modules 108 in accordance with examples of the present disclosure. For example, one or more music information retrieval modules 108 may include a source separation module 202, a beat tracking module 204, a chord estimation module 206, a key detection module 208, a music transcription module 210, a structure detection module 212, and/or a melody extraction module 214. It should be appreciated that more or fewer music information retrieval modules may be utilized in the mixing process without departing from the scope of the present disclosure. A source separation module 202 may apply a source separation algorithm, to separate the song 104 into different components, such as but not limited to a vocal component, a drum component, a bass component, and/or other components. As another example, the beat tracking module 204 may apply a beat tracking algorithm to detect, beats such as upbeats and downbeats and time stamps associated with such beat. The beat tracking module 204 may determine or otherwise infer a tempo associated with the song 104 based on the beats. As another example, the chord estimation module 206 may be used to estimate one or more chords that may be present within or otherwise comprise the song 104.

In accordance with examples of the present disclosure, data extracted or otherwise obtained from the one or more music information retrieval modules 108 and/or one or more music information retrieval algorithms may be provided to or otherwise fed to a music rules algorithm, which may consolidate the analyzed music metadata into a system readable format. For example, such system readable format may be stored and or otherwise associated with the song 104. In examples, the system readable format may be a MIDI format, that provides a standardized way for music sequences to be saved, transported, and opened.

Figure 3:
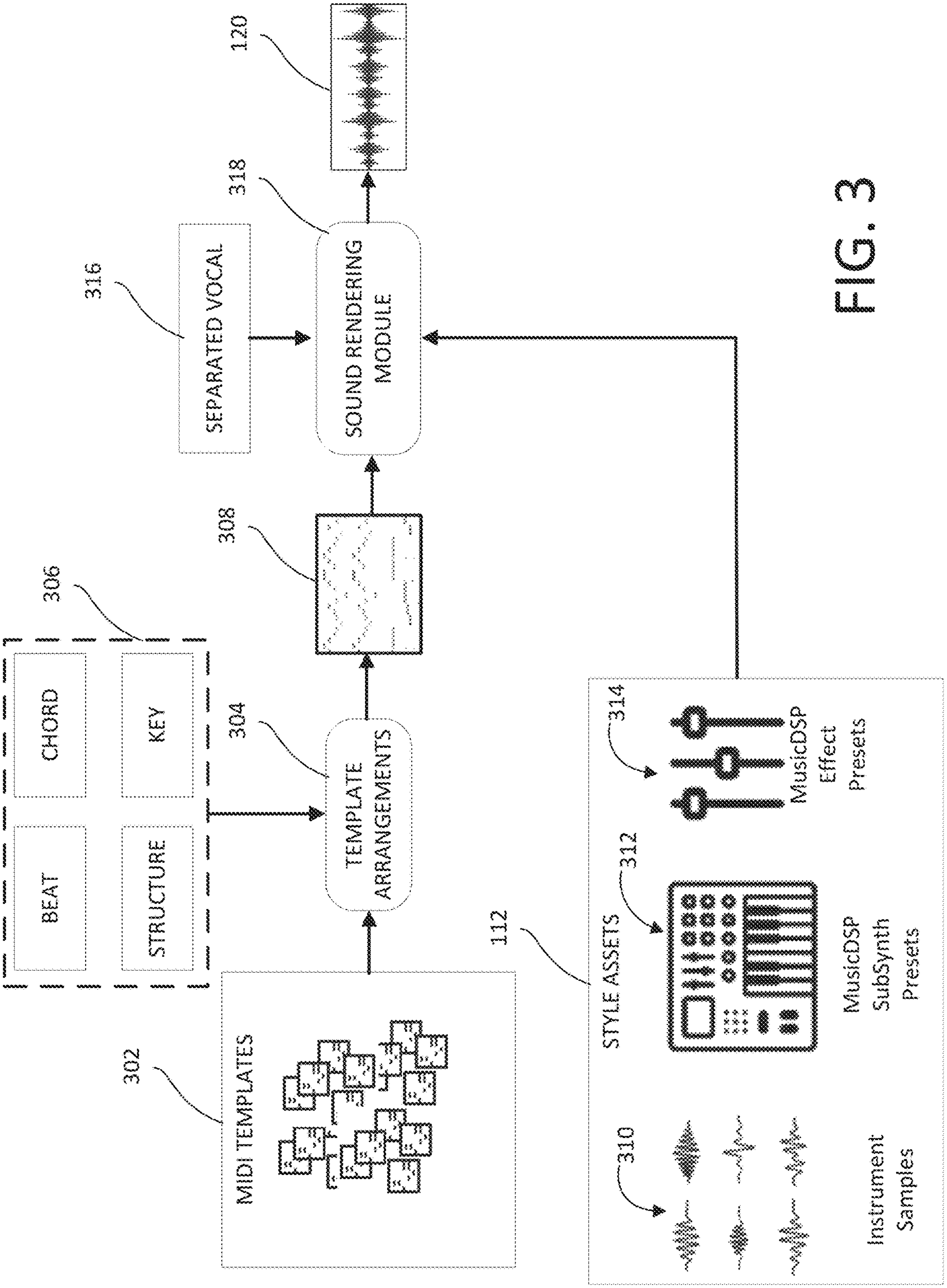
FIG. 3 illustrates details of the example system for generating a remixed audio sample in accordance with examples of the present disclosure.

FIG. 3 depicts additional details of an autoband 116 in accordance with examples of the present disclosure. In examples, one or more media templates may be utilized to provide or otherwise select one or more template arrangements 304, where such template arrangements 304 may depend on or otherwise be based on, metadata 306 associated with or otherwise extracted from the one or more music information retrieval modules 108 (e.g., 202-214). For example, a template arrangement may be obtained at 304 and used to generate or otherwise populate one or more MIDI tracks 308. One or more style assets 112 corresponding to instrument samples 310, music digital signal processing sub-synthesis presets 312, and/or one or more music digital signal processing effect presets 314, may be combined with the MIDI tracks 308 and/or otherwise added to the MIDI tracks 308. As another example, vocals 316 separately identified from or otherwise obtained from one or more of the music information retrieval modules 108 may also be added or otherwise, applied at the sound rendering module 318 to generate a remix song 120. That is, the sound rendering module 318 may generate a remix song 120.

Thus, the autoband 116 may utilize one or more algorithms to generate the instrumental tracks and symbolic representations such as those in the MIDI tracks 308, for example, based on the metadata obtained from the original song 108 via one or more music information retrieval modules 112, where the song metadata may include, but is not limited to the beat chord, key sections, structure, melody, etc. In accordance with examples of the present disclosure, the autoband may apply or otherwise utilize one or more knowledgebases, rules, and/or statistics to obtain the metadata and/or apply pre-defined assets to the key, tempo, chord progressions extracted from the original song 108 in order to generate the remixed song 120. As another example, chord types may be transformed based on one or more user selected styles or style assets. For example, a style asset may be applied or otherwise utilized based on the song structure and/or an output from one or more music information retrieval modules 112. In according to some examples of the present disclosure, one or more accompaniment patterns (e.g., selected instrument samples and/or DSP effects) may be generated based on one or more machine learning models. In examples, one or more symbolic representations, such as the MIDI tracks 308, may allow a user to interact with and, or modify one or more, portions of the original song 104 and/or remix song 120.

For example, and in accordance with examples of the present disclosure, one or more attributes or characteristics associated with the MIDI tracks 308 may be provided to a graphical user interface allowing a user to easily interact with and/or change, modify, or add one or more style assets 112. For example, a different instrument sample 310 or sound may be applied selected and one or more MIDI templates 302 may be applied or selected in the remix process based on a portion or clip of the original song 104. One or more digital signal processing effects may be applied to a localized portion or to the song in its entirety based on the generated metadata from the music information retrieval modules (108). That is, the sound rendering module 318, for example, may synthesize the symbolic representations provided by the MIDI tracks 308 into the audio format of the remixed song 120. In a accordance with examples of the present disclosure, sound synthesis techniques applied or otherwise utilized by the sound rendering module 318 may include a sampler, a wave table based synthesizer, and/or a DSP based music effect, where the wave table based synthesizer, and/or a DSP based music effect, may be utilized to generate the song 120. The system 100 is able to remix any songs into any styles based one or more user provided attributes and or metadata associated with the original song 104, obtained from the music information retrieval module 108. Accordingly, a highly innovative and customized audio output or remix song 120 may be obtained. As another example, one or more users may, customize or otherwise apply, user-specific or otherwise unique music assets, such as styles, to the music remix process to add personal touches or otherwise personalize the original song 104.

Figure 4:
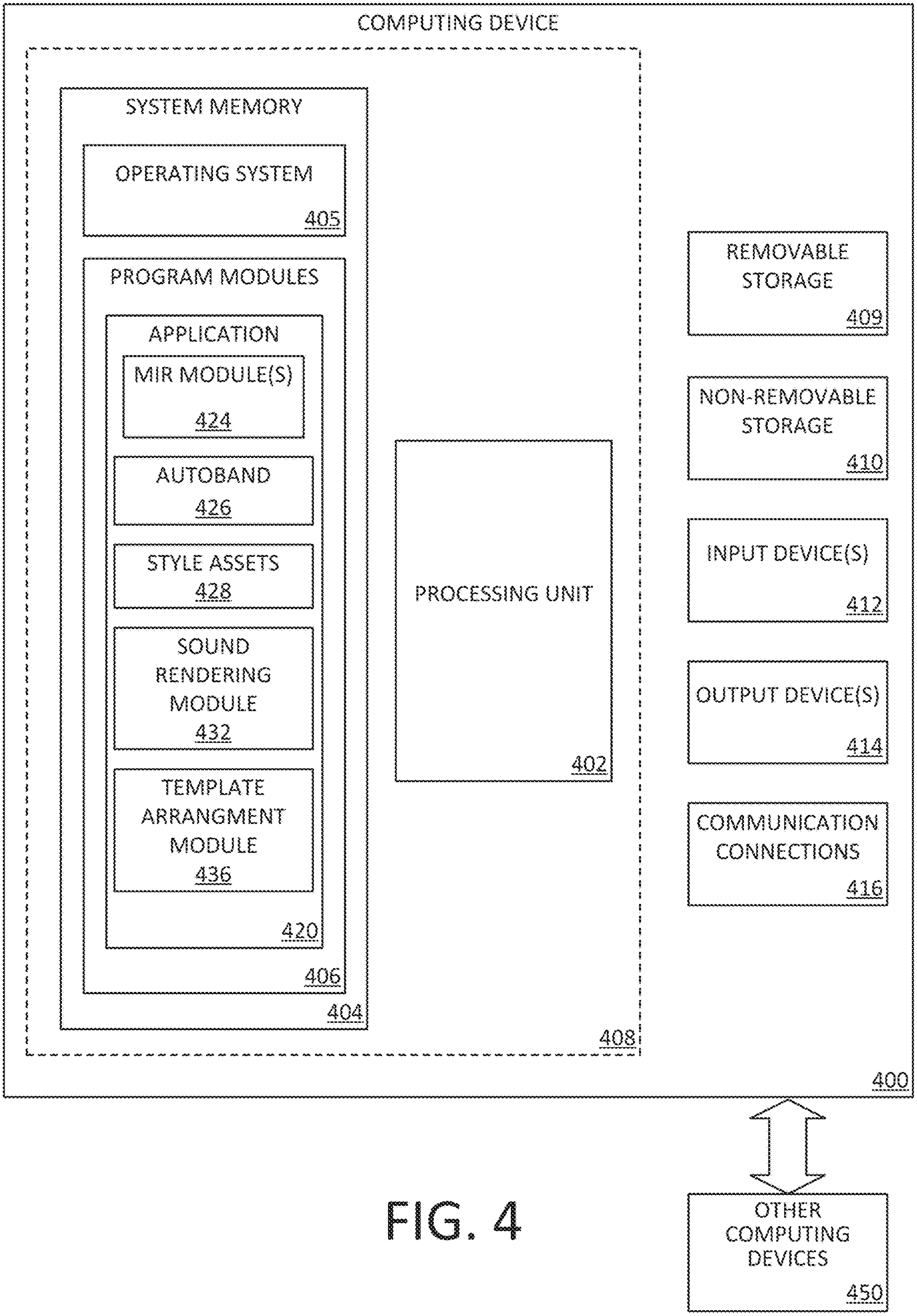
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may include one or more music information retrieval modules 424, one or more autobands 426, and one or more style assets 428, one or more sound rendering modules 432, and one or more template arrangement modules 436. The operating system 405, for example, may be suitable for controlling the operation of the computing device 400.

Furthermore, aspects of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5:
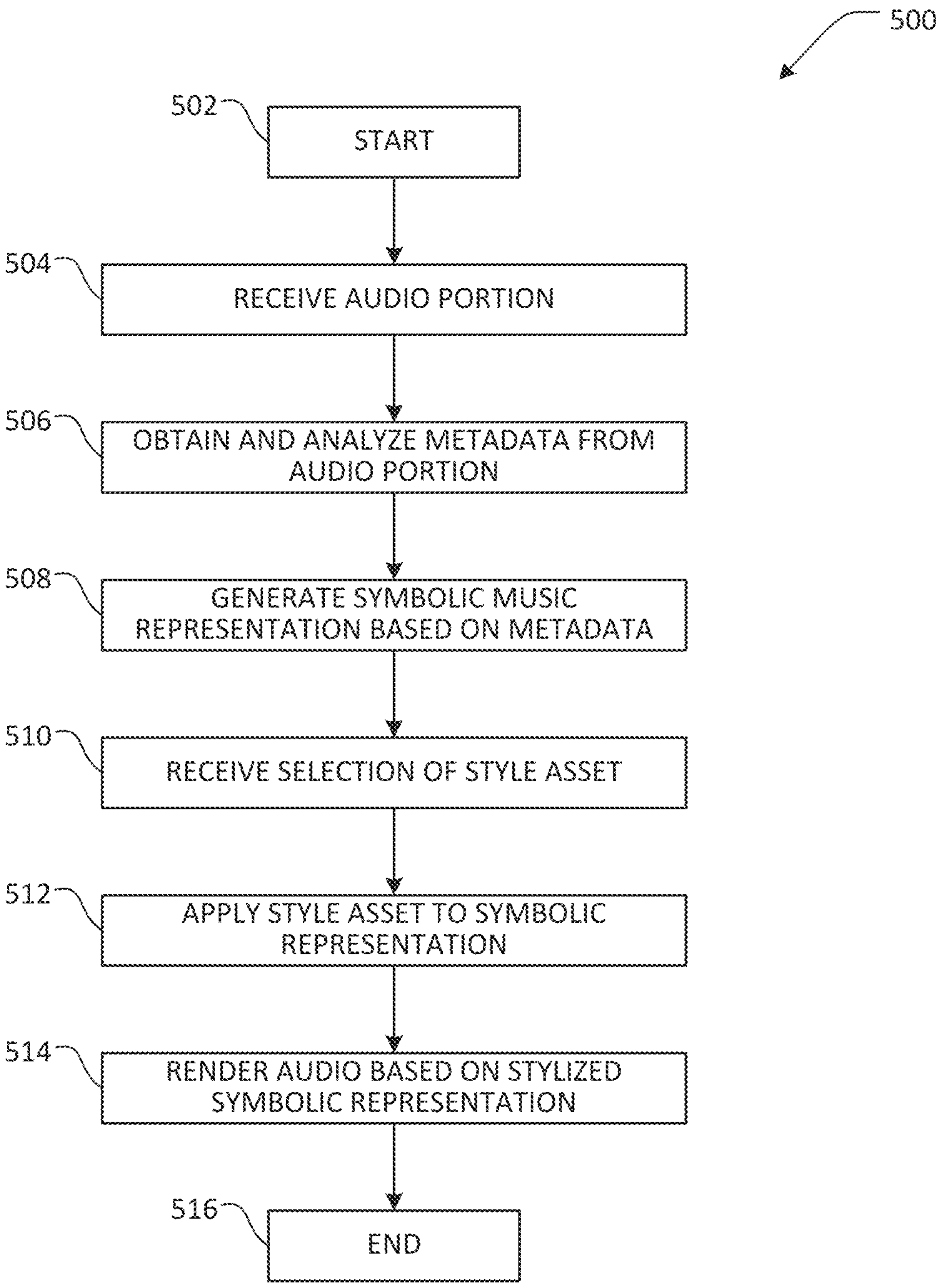
FIG. 5 illustrates an example flow of generating a remixed audio sample in accordance with examples of the present disclosure.

FIG. 5 depicts details of a method 500 for mixing one or more audio portions and obtaining a remixed version of the audio portion having customized instrumental arrangements and styles in accordance with examples of the present disclosure. A general order for the steps of the method 500 is shown in FIG. 5. Generally, the method 500 starts at 502 and ends at 516. The method 500 may include more or fewer steps or may arrange the order of the steps differently than those shown in FIG. 5. The method 500 can be executed as a set of computer-executable instructions executed by a computer system and encoded or stored on a computer readable medium. In examples, aspects of the method 500 are performed by one or more processing devices, such as a computing device (e.g., FIG. 4). Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method 500 starts at 502, where flow may proceed to 504. At 504, an audio portion is received. Alternatively, or in addition, a song including multiple audio portion is received. The method 500 may proceed to 506, where metadata from the audio portion is obtained and then analyzed. For example, one or more music information retrieval modules 108/424 may be used to obtain such metadata. In examples, the one or more music information retrieval modules 108/424 may include a source separation module, a beat tracking module, a chord estimation module, a key detection module, a music transcription module, a structure detection module, and/or a melody extraction module. It should be appreciated that more or fewer music information retrieval modules may be utilized in the mixing process without departing from the scope of the present disclosure. A source separation module may apply a source separation algorithm, to separate the audio portion into different components, such as but not limited to a vocal component, a drum component, a bass component, and/or other components. As another example, the beat tracking module may apply a beat tracking algorithm to detect, beats such as upbeats and downbeats and time stamps associated with such beat. The beat tracking module may determine or otherwise infer a tempo associated with the audio portion based on the beats. As another example, the chord estimation module may be used to estimate one or more chords that may be present within or otherwise comprise the audio portion.

In accordance with examples of the present disclosure, the method 500 may then proceed to 508, where data, e.g., metadata, extracted or otherwise obtained from the one or more music information retrieval modules and/or one or more music information retrieval algorithms may be provided to or otherwise fed to a music rules algorithm, which may consolidate the analyzed music metadata into a symbolic music representation. For example, such system music representation may be in a MIDI format, such as but not limited to a MIDI track, that provides a standardized way for music sequences to be saved, transported, and opened. In some examples, one or more media templates may be utilized to provide or otherwise select one or more template arrangements, where such template arrangements may depend on or otherwise be based on, metadata associated with or otherwise extracted from the one or more music information retrieval modules. For example, a template arrangement may be obtained and used to generate or otherwise populate one or more music symbolic representations, such as one or more MIDI tracks.

The method 500 may proceed to 510, where a selection of a style asset may be received. In examples, the style asset may correspond to an instrument samples 310, music digital signal processing sub-synthesis presets 312, and/or one or more music digital signal processing effect presets 314. The method 500 may then proceed to 512, where the selected style asset may be applied to the symbolic representation. That is, the selected style asset may be combined with the MIDI tracks and/or otherwise added to the MIDI tracks. The method 500 may then proceed to 514, where a sound rendering module may generate a remixed audio portion. In some examples, separate vocals may be combined with the music symbolic representation and a style asset to generate the remixed audio portion. The method 516 may then end at 516.

FIGS. 6A-8 and the associated descriptions provide a discussion of a variety of operating environments in which aspects of the disclosure may be practiced. However, the devices and systems illustrated and discussed with respect to FIGS. 6A-8 are for purposes of example and illustration and are not limiting of a vast number of computing device configurations that may be utilized for practicing aspects of the disclosure, described herein.

Figure 6A:
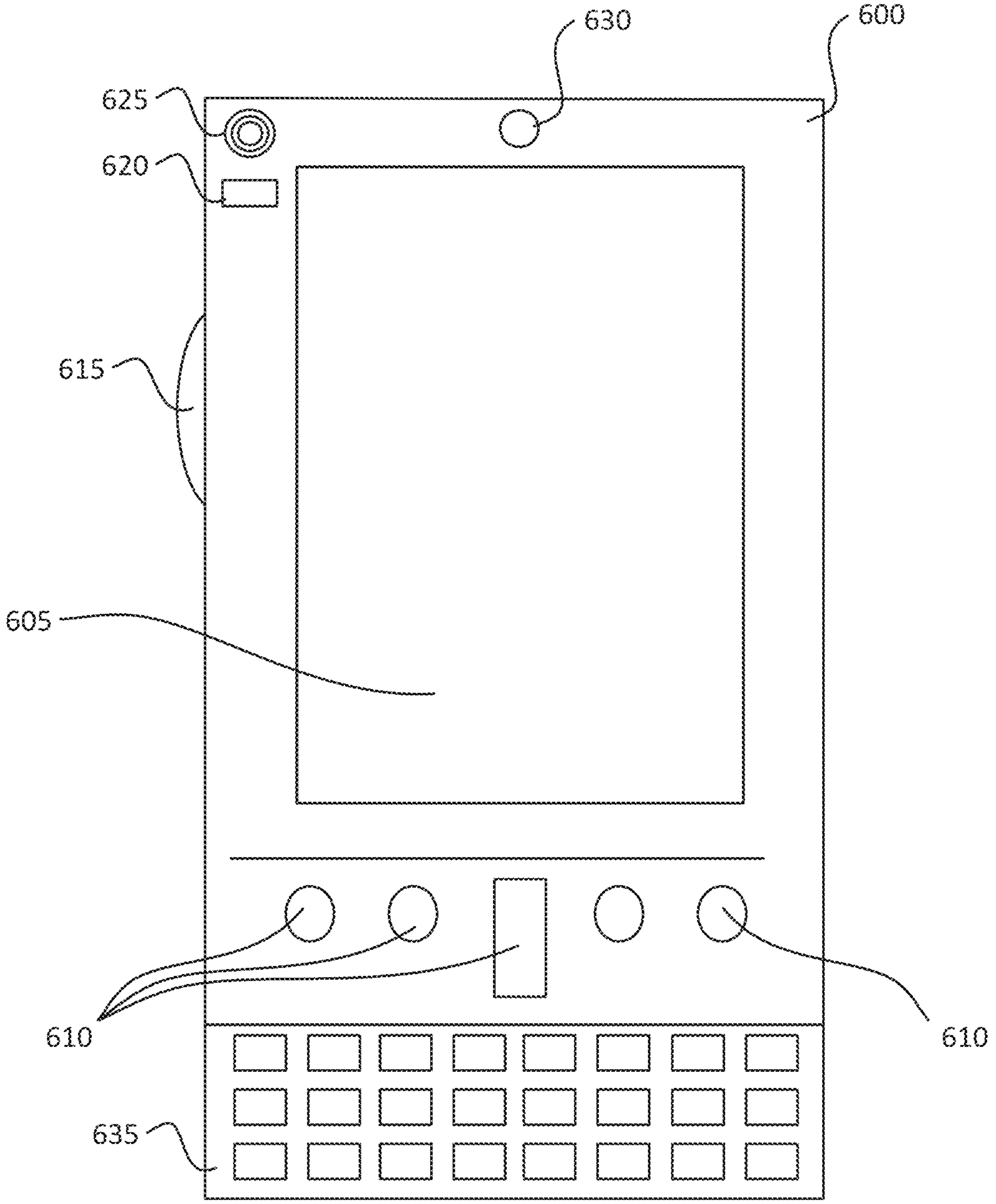
FIGS. 6A and 6B are simplified block diagrams of a mobile computing device with which aspects of the present disclosure may be practiced.
Figure 6B:
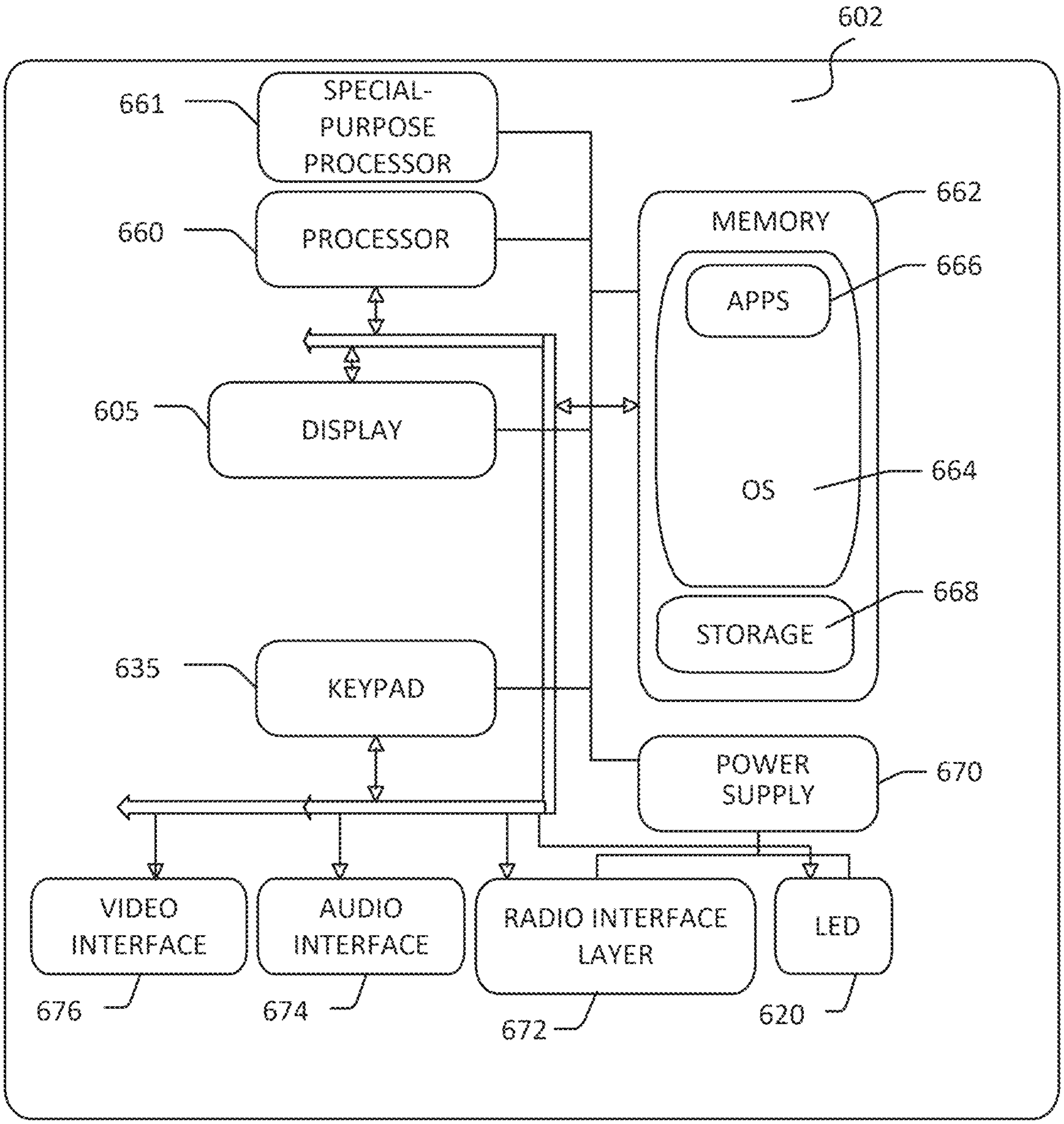

FIGS. 6A and 6B illustrate a mobile computing device 600, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some examples.

In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display.

In various examples, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In some examples, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., a task management engine, communication generation engine, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and/or special-purpose processor 661 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
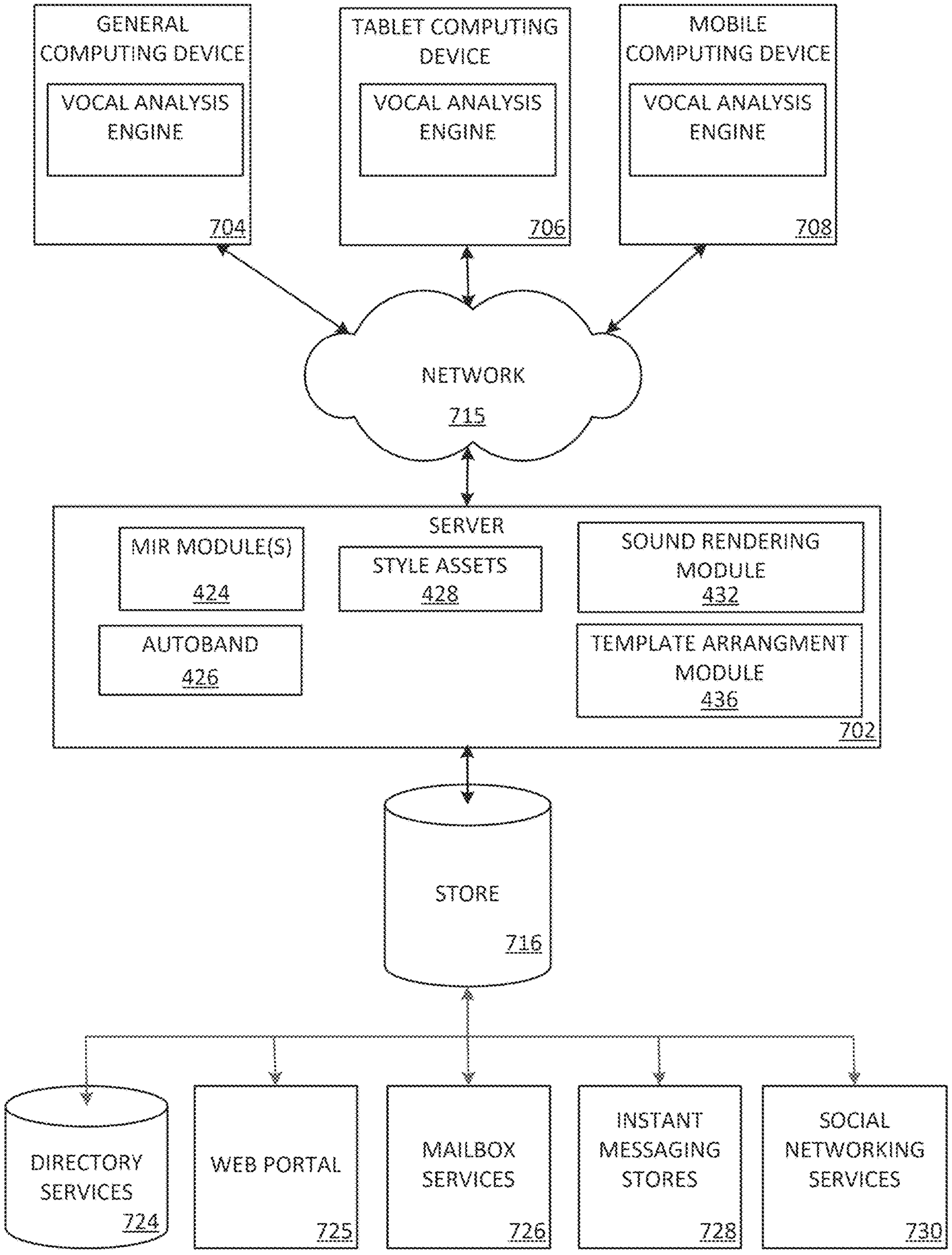
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 724, a web portal 725, a mailbox service 726, an instant messaging store 728, or a social networking site 730.

The client device 704-708 and/or the server device 702 may include one or more music information retrieval modules 424, one or more autobands 426, and one or more style assets 428, one or more sound rendering modules 432, and one or more template arrangement modules 436. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these examples of the computing devices may obtain content from the store 716, in addition to receiving graphical data useable to be either pre-processed at a graphic-originating system, or post-processed at a receiving computing system.

Figure 8:
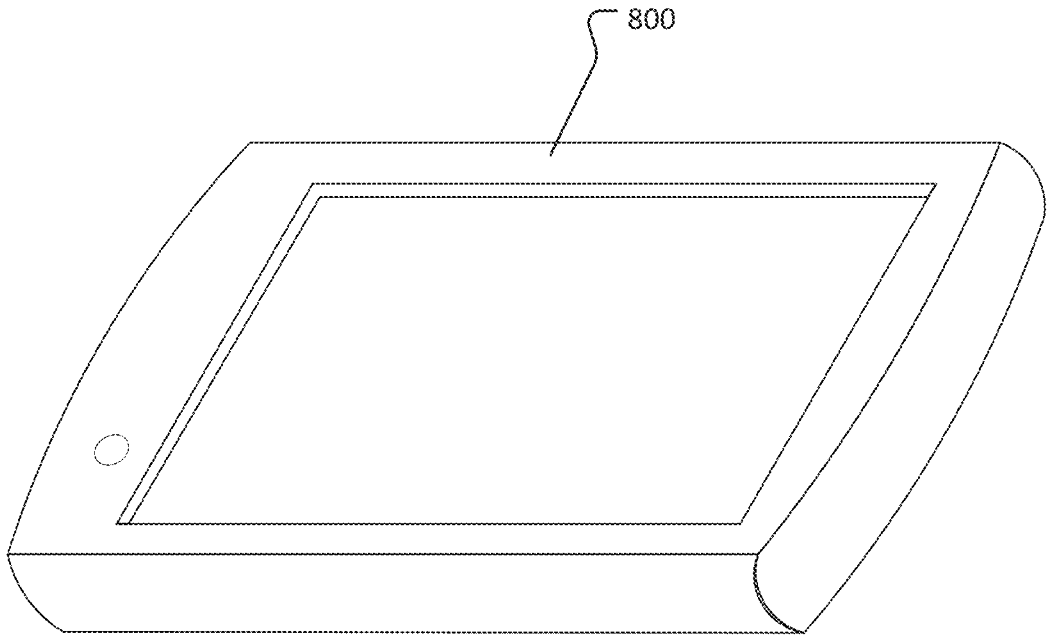
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for generating a remixed audio sample, the method comprising:
- receiving an audio portion;
- obtaining metadata from the received audio portion;
- analyzing the metadata and generating a symbolic music representation based on the analyzed metadata;
- receiving a selection of a style asset;
- applying the style asset to the symbolic music representation to generate a stylized symbolic representation; and
- generating a remixed audio sample by rendering a remixed audio portion based on the stylized symbolic representation.

2. The method of claim 1, wherein the metadata from the received audio portion includes at least one of tempo, vocals, music transcription, audio key, music structure, and/or melody.

3. The method of claim 2, wherein the metadata is obtained utilizing one or more music information retrieval modules.

4. The method of claim 2, further comprising obtaining a symbolic music representation template and applying the symbolic music representation template in an arranged manner to generate the symbolic music representation based on the analyzed metadata.

5. The method of claim 2, wherein the style asset includes at least one of an instrument sample and a digital signal processing effect.

6. The method of claim 1, further comprising:
- obtaining a symbolic music representation template and applying the symbolic music representation template in an arranged manner to generate the symbolic music representation based on the analyzed metadata, wherein the metadata from the received audio portion includes at least one of tempo, vocals, music transcription, audio key, music structure, and/or melody, and the remixed audio portion is obtained using a sound rendering module that applies the style asset to the symbolic music representation based on the analyzed metadata.

7. The method of claim 6, further comprising adding one or more separate vocal tracks to the remixed audio portion using the sound rendering module.

8. The method of claim 1, wherein the symbolic music representation is in MIDI format.

9. A system for generating a remixed audio sample, the system comprising:
- at least one processor; and
- memory storing instructions that, when executed by the at least one processor, causes the system to perform a set of operations, the set of operations including:
  - receiving an audio portion;
  - obtaining metadata from the received audio portion;
  - analyzing the metadata and generating a symbolic music representation based on the analyzed metadata;
  - receiving a selection of a style asset;
  - applying the style asset to the symbolic music representation to generate a stylized symbolic representation; and
  - rendering a remixed audio portion based on the stylized symbolic representation.

10. The system of claim 9, wherein the metadata from the received audio portion includes at least one of tempo, vocals, music transcription, audio key, music structure, and/or melody.

11. The system of claim 10, wherein the metadata is obtained utilizing one or more music information retrieval modules.

12. The system of claim 10, wherein the instructions, when executed by the at least one processor, cause the system to perform the set of operations including:
- obtaining a symbolic music representation template and applying the symbolic music representation template in an arranged manner to generate the symbolic music representation based on the analyzed metadata.

13. The system of claim 9, wherein the instructions, when executed by the at least one processor, cause the system to perform the set of operations including:
- obtaining a symbolic music representation template and applying the symbolic music representation template in an arranged manner to generate the symbolic music representation based on the analyzed metadata, wherein the metadata from the received audio portion includes at least one of tempo, vocals, music transcription, audio key, music structure, and/or melody, and the remixed audio portion is obtained using a sound rendering module that applies the style asset to the symbolic music representation based on the analyzed metadata.

14. The system of claim 13, wherein the instructions, when executed by the at least one processor, cause the system to perform the set of operations including:
- adding one or more separate vocal tracks to the remixed audio portion using the sound rendering module.

15. A computer-readable medium including processor executable instructions, which when executed by a processor, cause the processor to:
- receive an audio portion;
- obtain metadata from the received audio portion;
- analyze the metadata and generating a symbolic music representation based on the analyzed metadata;
- receive a selection of a style asset;
- apply the style asset to the symbolic music representation to generate a stylized symbolic representation; and
- render a remixed audio portion based on the stylized symbolic representation.

16. The computer-readable medium of claim 15, wherein the metadata from the received audio portion includes at least one of tempo, vocals, music transcription, audio key, music structure, and/or melody.

17. The computer-readable medium of claim 16, wherein the metadata is obtained utilizing one or more music information retrieval modules.

18. The computer-readable medium of claim 16, wherein the processor executable instructions, when executed by the processor, cause the processor to:

obtain a symbolic music representation template and applying the symbolic music representation template in an arranged manner to generate the symbolic music representation based on the analyzed metadata.

19. The computer-readable medium of claim 16, wherein the style asset includes at least one of an instrument sample and a digital signal processing effect.

20. The computer-readable medium of claim 15, wherein the processor executable instructions, when executed by the processor, cause the processor to:

obtaining a symbolic music representation template and applying the symbolic music representation template in an arranged manner to generate the symbolic music representation based on the analyzed metadata, wherein the metadata from the received audio portion includes at least one of tempo, vocals, music transcription, audio key, music structure, and/or melody, and the remixed audio portion is obtained using a sound rendering module that applies the style asset to the symbolic music representation based on the analyzed metadata.

* * * * *